(12) United States Patent
Klop et al.

(10) Patent No.: US 11,180,203 B2
(45) Date of Patent: Nov. 23, 2021

(54) ACTIVE FASCIA SPLITTER AND ENGINE SHIELD

(71) Applicant: Ford Global Technologies, LLC, Dearborn, MI (US)

(72) Inventors: Aaron Peter Klop, Bloomfield Hills, MI (US); Joseph James Gallo, Fraser, MI (US); Sudesh Woodiga, Dearborn, MI (US); Jonathan David Gesek, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 16/687,852

(22) Filed: Nov. 19, 2019

(65) Prior Publication Data
US 2021/0147010 A1 May 20, 2021

(51) Int. Cl.
*B62D 35/00* (2006.01)
*B62D 37/02* (2006.01)
*B62D 35/02* (2006.01)

(52) U.S. Cl.
CPC ........... *B62D 35/005* (2013.01); *B62D 35/02* (2013.01); *B62D 37/02* (2013.01)

(58) Field of Classification Search
CPC ....... B62D 35/005; B62D 35/02; B62D 37/02
See application file for complete search history.

(56) References Cited

U.S. PATENT DOCUMENTS

| | | | | |
|---|---|---|---|---|
| 4,778,212 A | * | 10/1988 | Tomforde | B62D 35/005 296/180.1 |
| 4,810,021 A | * | 3/1989 | Burst | B60T 5/00 296/180.1 |
| 5,458,391 A | * | 10/1995 | Ito | B62D 35/005 296/180.1 |
| 5,511,847 A | * | 4/1996 | Weisbarth | B60C 23/18 296/180.1 |
| 6,209,947 B1 | * | 4/2001 | Rundels | B62D 35/005 296/180.1 |
| 6,286,893 B1 | * | 9/2001 | Presley | B62D 35/005 296/180.5 |
| 6,886,883 B2 | | 5/2005 | Jacquemard et al. | |
| 8,100,460 B2 | | 1/2012 | Butlin, Jr. et al. | |
| 8,702,152 B1 | | 4/2014 | Platto et al. | |

(Continued)

FOREIGN PATENT DOCUMENTS

| | | | | |
|---|---|---|---|---|
| DE | 4208999 | * | 9/1993 | ............. B62J 35/02 |
| FR | 3089483 | * | 6/2020 | ........... B62D 35/005 |

OTHER PUBLICATIONS

Computer generated translation of DE 4208999 (Year: 1993).*

*Primary Examiner* — Gregory A Blankenship
(74) *Attorney, Agent, or Firm* — David Coppiellie; Carlson, Gaskey & Olds, P.C.

(57) ABSTRACT

A method and an apparatus, according to an exemplary aspect of the present disclosure includes, among other things, a fascia having a first fascia portion that is selectively moveable relative to a second fascia portion, and an engine shield that has at least a first shield panel and a second shield panel. The first shield panel has a first portion that moves with the first fascia portion and a second portion that is connected to a vehicle static structure. The second shield panel is mounted for movement with the first fascia portion. At least one actuator selectively moves the first fascia portion relative to the second fascia portion in response to at least one predetermined vehicle input condition.

20 Claims, 9 Drawing Sheets

(56) References Cited

U.S. PATENT DOCUMENTS

| | | | | |
|---|---|---|---|---|
| 9,469,354 B1* | 10/2016 | Ciccone | ............... | G05D 3/00 |
| 9,517,802 B1* | 12/2016 | Froling | ............... | B62D 35/005 |
| 2004/0113457 A1* | 6/2004 | JaCquemard | ............... | B62D 35/005 |
| | | | | 296/180.1 |
| 2009/0115221 A1* | 5/2009 | Shinedling | ............... | B62D 37/02 |
| | | | | 296/180.5 |
| 2010/0140976 A1* | 6/2010 | Browne | ............... | B62D 35/005 |
| | | | | 296/180.1 |
| 2012/0169085 A1* | 7/2012 | Verhee | ............... | B62D 35/005 |
| | | | | 296/180.1 |
| 2012/0292943 A1* | 11/2012 | Danev | ............... | B62D 35/005 |
| | | | | 296/180.1 |
| 2015/0225026 A1* | 8/2015 | Ohira | ............... | B62D 25/08 |
| | | | | 296/180.1 |
| 2016/0264194 A1* | 9/2016 | Goldberg | ............... | B62D 35/005 |
| 2017/0080770 A1* | 3/2017 | Irwin | ............... | B62D 35/005 |
| 2017/0106922 A1* | 4/2017 | Povinelli | ............... | B62D 35/02 |
| 2017/0158259 A1* | 6/2017 | Fahland | ............... | B62D 37/02 |
| 2017/0158262 A1* | 6/2017 | Shami | ............... | B62D 35/005 |
| 2017/0166267 A1* | 6/2017 | Ribaldone | ............... | B62D 37/02 |
| 2018/0099703 A1* | 4/2018 | Yoon | ............... | B62D 25/182 |
| 2018/0134331 A1* | 5/2018 | Yoon | ............... | B62D 37/02 |
| 2018/0154952 A1* | 6/2018 | Klop | ............... | B62D 35/005 |
| 2018/0290535 A1* | 10/2018 | McMillan | ............... | B62D 35/005 |
| 2019/0092402 A1* | 3/2019 | Fahland | ............... | B60W 30/02 |
| 2019/0144053 A1* | 5/2019 | Bednarchik | ............... | B62D 35/02 |
| | | | | 296/198 |
| 2019/0210667 A1* | 7/2019 | Palmer | ............... | B62D 25/20 |
| 2019/0233025 A1* | 8/2019 | Mitidieri | ............... | B62D 35/02 |
| 2020/0047827 A1* | 2/2020 | Solazzo | ............... | B62D 37/02 |
| 2020/0055547 A1* | 2/2020 | Koeppe | ............... | B62D 35/02 |
| 2020/0094889 A1* | 3/2020 | Shiga | ............... | B62D 35/005 |
| 2020/0207428 A1* | 7/2020 | Nakata | ............... | B62D 35/005 |
| 2020/0324833 A1* | 10/2020 | Danev | ............... | B62D 35/005 |
| 2020/0361545 A1* | 11/2020 | Nichols | ............... | B62D 35/02 |
| 2020/0385070 A1* | 12/2020 | Cattell | ............... | B62D 25/12 |
| 2021/0070379 A1* | 3/2021 | Mao | ............... | B62D 37/02 |

\* cited by examiner

ACTIVE FASCIA SPLITTER AND ENGINE SHIELD

TECHNICAL FIELD

This disclosure relates generally to an active fascia splitter and engine shield for a performance vehicle.

BACKGROUND

Performance vehicles, while driving at higher speeds, can create lift similar to an aircraft wing. Front fascia splitters are used to reduce lift and increase down force to improve cornering ability. Geometries of such splitters have been limited to allow vehicles to drive on angled surfaces or avoid damage due to ground contact in jounce conditions.

SUMMARY

An apparatus according to an exemplary aspect of the present disclosure includes, among other things, a fascia having a first fascia portion that is selectively moveable relative to a second fascia portion, and an engine shield that has at least a first shield panel and a second shield panel. The first shield panel has a first portion that moves with the first fascia portion and a second portion that is connected to a vehicle static structure. The second shield panel is mounted for movement with the first fascia portion. At least one actuator selectively moves the first fascia portion relative to the second fascia portion in response to at least one predetermined vehicle input condition.

In a further non-limiting embodiment of the foregoing apparatus, the first portion of the first shield panel moves with the first fascia portion via at least one hinge.

In a further non-limiting embodiment of any of the foregoing apparatus, the second portion of the first shield panel is connected to the vehicle static structure with at least one hinge.

In a further non-limiting embodiment of any of the foregoing apparatus, the fascia is configured to extend across an entire front of a vehicle, and wherein the second fascia portion is held fixed while the first fascia portion is lowered toward ground by the at least one actuator in response to one or more predetermined vehicle input conditions.

In a further non-limiting embodiment of any of the foregoing apparatus, the first portion of the first shield panel comprises a front edge and the second portion of the first shield panel comprises a rear edge, and wherein the front edge moves with the first fascia portion when the first fascia portion is lowered toward the ground and wherein the first shield panel rotates at the rear edge when the first fascia portion is lowered such that the first shield panel is angled relative to ground with the rear edge being vertically higher than the front edge.

In a further non-limiting embodiment of any of the foregoing apparatus, the first shield portion comprises a center panel and wherein the second shield panel includes at least left and right side portions that move vertically with the first fascia portion to lower respectively in front of left and right side tires.

In a further non-limiting embodiment of any of the foregoing apparatus, the at least one predetermined vehicle input condition includes at least one of the following: vehicle speed, road condition, braking input, driver select mode.

In a further non-limiting embodiment of any of the foregoing apparatus, the at least one actuator comprises at least left and right side linear actuators.

In a further non-limiting embodiment of any of the foregoing apparatus, a control module controls the at least one actuator based on one or more predetermined vehicle input conditions.

An apparatus, according to yet another exemplary aspect of the present disclosure includes, among other things, a front fascia having a lower fascia portion that is selectively moveable relative to an upper fascia portion, and an engine shield that includes at least a first shield panel and a second shield panel. The first shield panel has a first portion that moves with the lower fascia portion and a second portion that is connected to a vehicle static structure. The second shield panel includes at least left and right side portions that move with the lower fascia portion. At least one actuator selectively moves the lower fascia portion relative to the upper fascia portion, and a control module controls the at least one actuator based on one or more predetermined vehicle input conditions.

In a further non-limiting embodiment of any of the foregoing apparatus, the first portion of the first shield panel comprises a front edge and the second portion of the first shield panel comprises a rear edge, and including at least a first hinge connection at the front edge and a second hinge connection at the rear edge.

In a further non-limiting embodiment of any of the foregoing apparatus, the left and right side portions of the second shield panel each include an angled ramp portion extending outwardly of a main panel body.

In a further non-limiting embodiment of any of the foregoing apparatus, the angled ramp portion of the right side portion is aligned with a right side tire and the angled ramp portion of the left side portion is aligned with a left side tire such that as the lower fascia portion is lowered relative to ground, the angled ramp portions of the left and right side portions move vertically downward in front of the left and right side tires.

In a further non-limiting embodiment of any of the foregoing apparatus, the front fascia is configured to extend across an entire front of a vehicle, and wherein the upper fascia portion is held fixed while the lower fascia portion is lowered toward ground by the at least one actuator in response to one or more predetermined vehicle input conditions, and wherein the front edge of the first shield panel moves with the lower fascia portion when the lower fascia portion is lowered toward the ground and wherein the first shield panel rotates at the rear edge when the lower fascia portion is lowered such that the first panel is angled relative to ground with the rear edge being vertically higher than the front edge.

In a further non-limiting embodiment of any of the foregoing apparatus, the at least one predetermined vehicle input condition includes at least one of the following: vehicle speed, road condition, braking input, driver select mode.

In a further non-limiting embodiment of any of the foregoing apparatus, the at least one actuator comprises at least left and right side linear actuators.

A method according to still another exemplary aspect of the present disclosure includes, among other things: providing a front fascia including a lower fascia portion that is selectively moveable relative to an upper fascia portion; providing an engine shield including at least a first shield panel and a second shield panel; configuring the first shield panel to have a first portion that moves with the lower fascia portion and a second portion that is rotatably connected to a vehicle static structure; configuring the second shield panel to move with the first fascia portion; and selectively moving the lower fascia portion relative to the upper fascia portion in response to at least one predetermined vehicle input condition.

In a further non-limiting embodiment of the foregoing method, the method includes extending the front fascia across an entire front of a vehicle, fixing the upper fascia portion to a static structure, and selectively lowering the lower fascia portion toward ground with at least one actuator in response to one or more predetermined vehicle input conditions.

In a further non-limiting embodiment of any of the foregoing methods, the second shield panel includes at least left and right side portions, and wherein the first portion of the first shield panel comprises a front edge and the second portion of the first shield panel comprises a rear edge and, when the lower fascia portion is lowered toward the ground, the front edge of the first shield panel moves with the lower fascia portion and the first shield panel rotates at the rear edge such that the first shield panel is angled relative to ground with the rear edge being vertically higher than the front edge, and the left and right side portions of the second shield panel move vertically with the lower fascia portion to lower respectively in front of left and right side tires.

In a further non-limiting embodiment of any of the foregoing methods, the at least one predetermined vehicle input condition includes at least one of the following: vehicle speed, road condition, braking input, driver select mode.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1A:
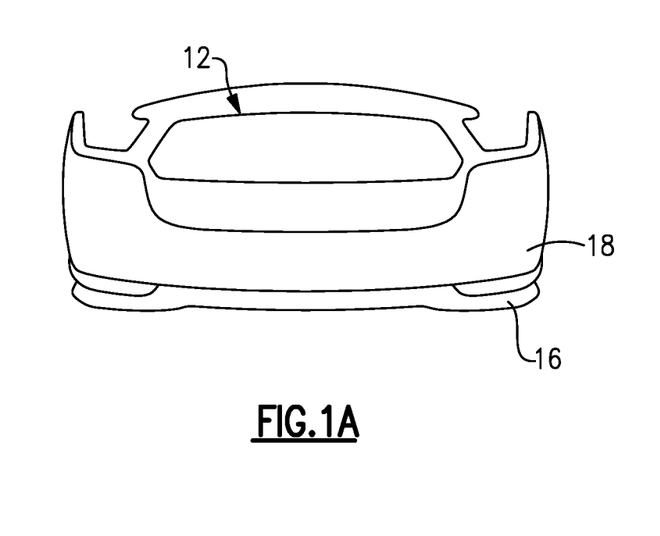
FIG. 1A illustrates a fascia having an upper fascia portion and a lower fascia portion, which is selectively moveable relative to the upper fascia portion, and wherein the lower fascia portion is shown in a raised or non-deployed position.
Figure 1B:
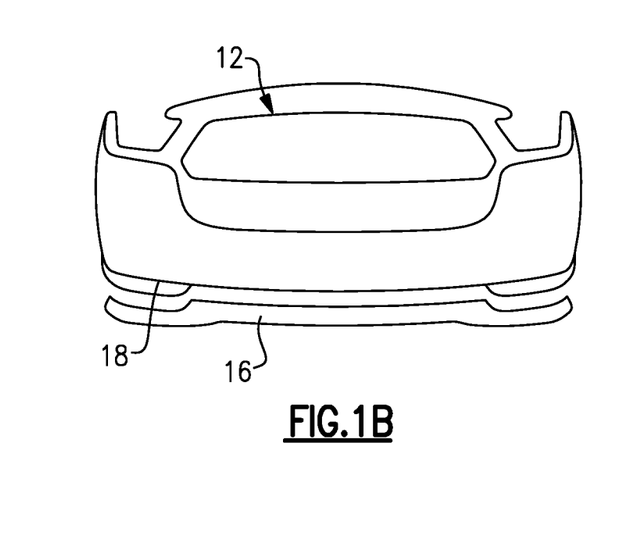
FIG. 1B is similar to FIG. 1A but showing the lower fascia portion in a lowered or deployed position.

This disclosure details, among other things, an exemplary active fascia splitter and engine shield for a performance vehicle FIG. 1A shows a front fascia 12 of a vehicle 14 (FIG. 7A) that is referred to as an active front fascia splitter. The fascia 12 is configured to extend across an entire front of the vehicle 14 and includes a lower fascia portion 16 that is selectively moveable relative to an upper fascia portion 18. FIG. 1A shows the lower fascia portion 16 in a raised or non-deployed position and FIG. 1B shows the lower fascia portion 16 in a lowered or deployed position relative to the upper fascia portion 18.

Figure 2:
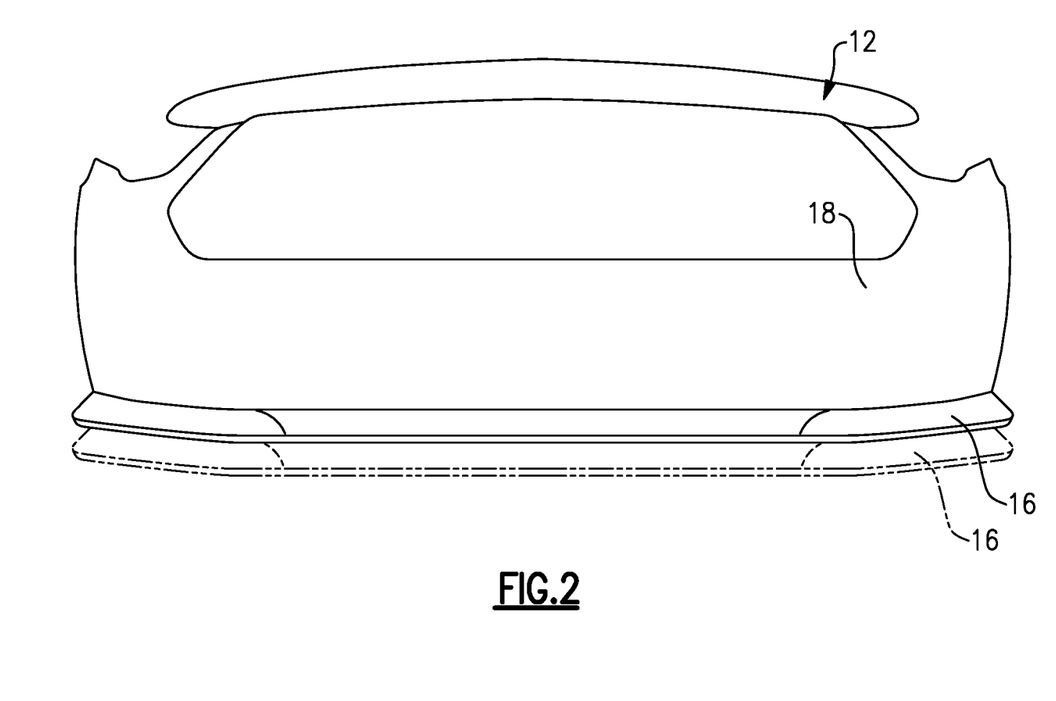
FIG. 2 is a front view of the fascia showing a relative position of the lower fascia portion relative to the upper fascia portion in the deployed and non-deployed positions.

FIG. 2 shows the a front view of the fascia 12 showing a position of the lower fascia portion 16 relative to the upper fascia portion 18 in both the deployed and non-deployed positions. In the example shown in FIG. 2, the lower fascia portion 16 has been lowered relative to ground by approximately 50 mm. The range of deployment can be varied dependent on type of vehicle and packaging constraints.

Figure 3:
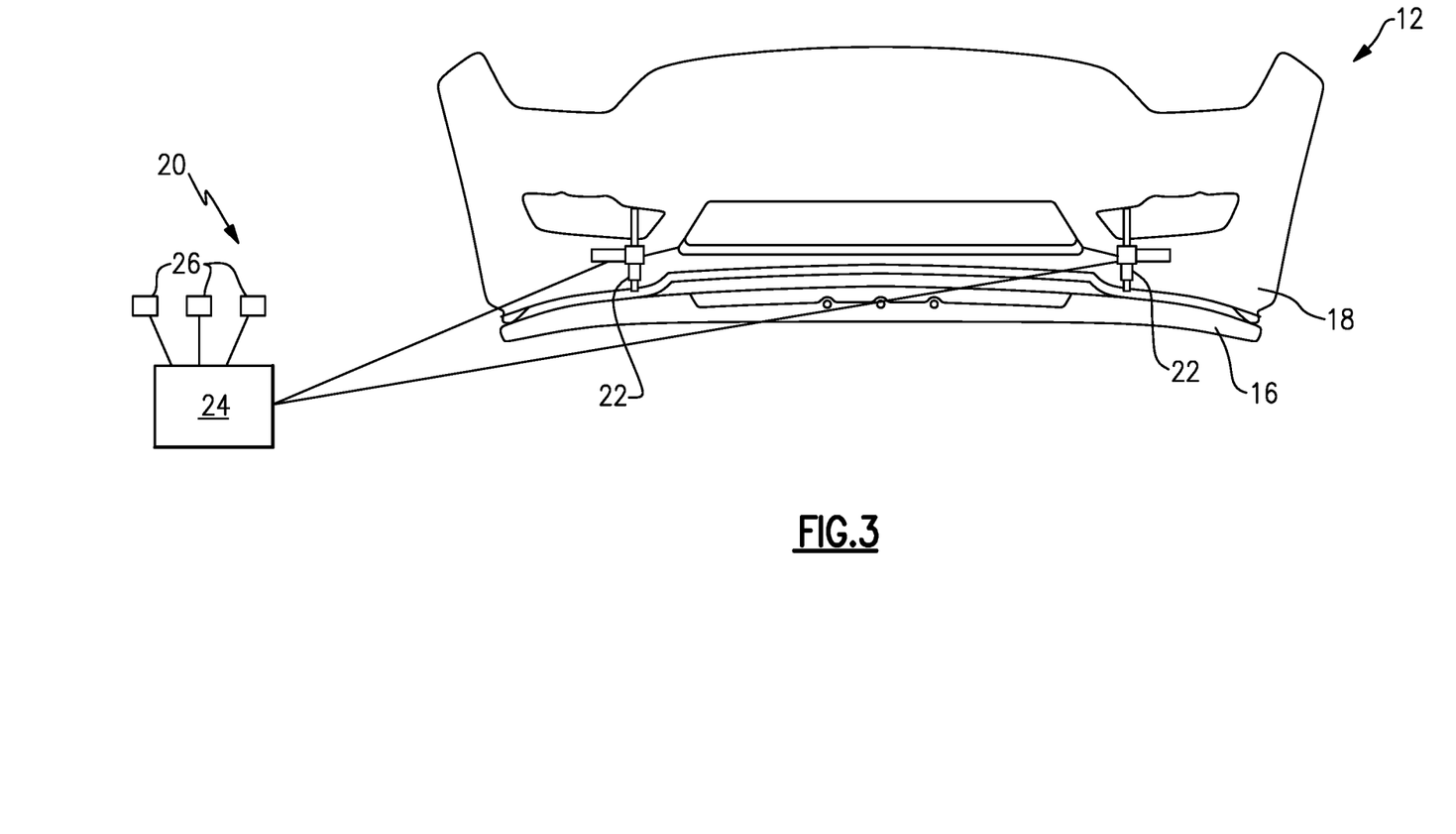
FIG. 3 is a rear view of the fascia showing an actuation system for moving the lower fascia portion that includes right and left linear actuators.

FIG. 3 shows an actuation system 20 that is used to selectively move the lower fascia portion 16 between the deployed and non-deployed positions. In one example, the actuator system 20 uses one or more linear actuators 22 that are configured to the lower fascia portion 16. In one example, at least two linear actuators 22 are utilized, one on a right hand side of the fascia 12 and one on the left hand side of the fascia 12. The linear actuators 22 are controlled by a control unit or control module 24 to selectively raise or lower the lower fascia portion 16 in response to at least one predetermined vehicle input condition. In one example, the at least one predetermined vehicle input condition includes at least one of the following: vehicle speed, road condition, braking input, driver select mode. A plurality of sensors 26 provide this type of information to the control module 24.

Figure 4:
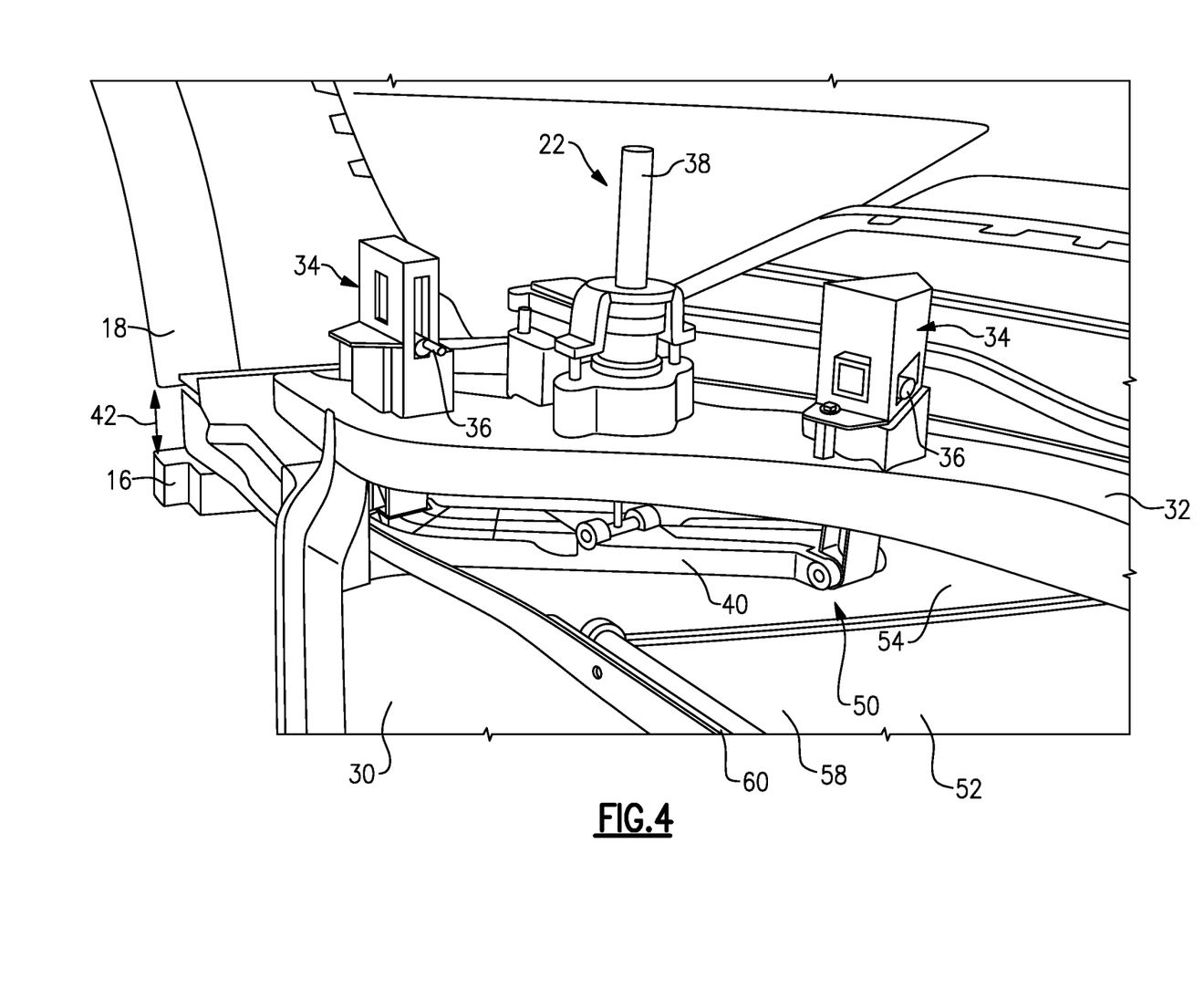
FIG. 4 is a perspective view of one of the linear actuators.

One example of a linear actuator 22, as used in the actuation system 20, is shown in FIG. 4. A static structure 30 comprises a vehicle panel or frame for example. The linear actuator 22 includes a support frame 32 that is fixed to static structure 30 and one or more vertical slide mechanisms 34 that include sliders 36 that move relative to the support frame 32. The linear actuator 22 includes a moveable rod 38 that is configured to move the lower fascia portion 16 via a bracket 40 that is coupled to belly pan or an engine shield 50. The sliders 36 are also coupled to the bracket 40 to assist with controlling the movement of the lower fascia portion 16 relative to the upper fascia portion 18 as indicated at 42. The use of a linear actuator is just one example of an actuator for the actuation system. Other actuators, such as a four-bar linkage for example, could also be used.

Figure 5:
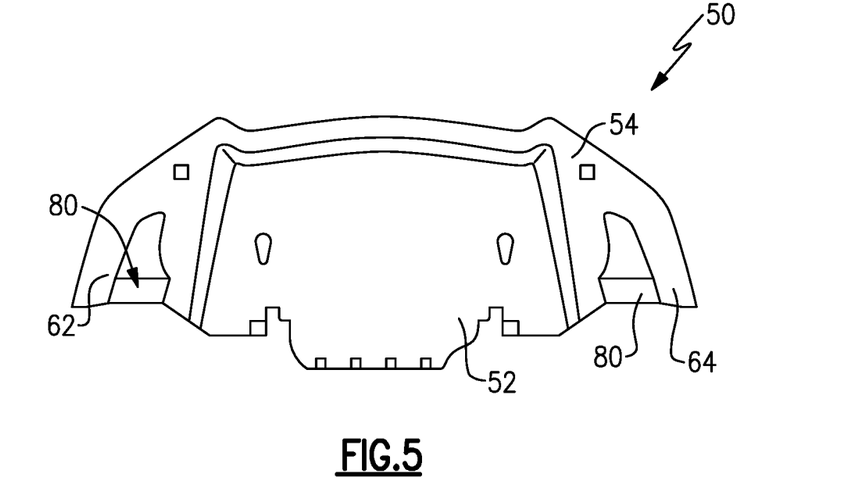
FIG. 5 is a bottom view of an engine shield.
Figure 6:
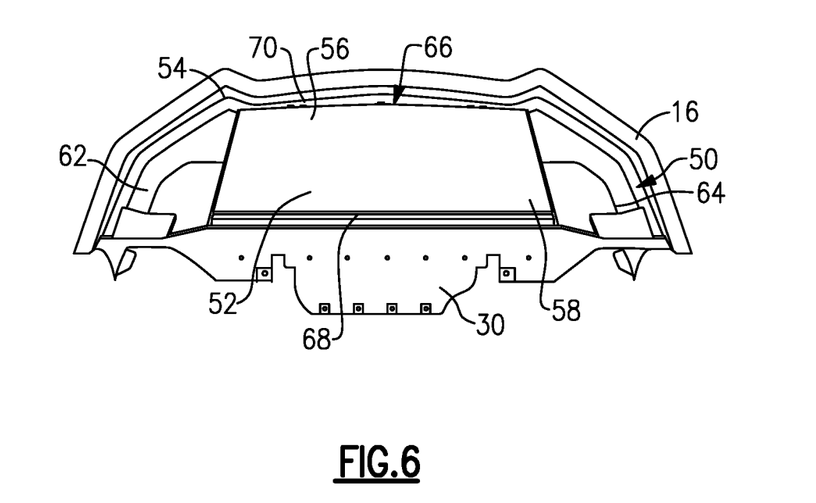
FIG. 6 is a top view showing the engine shield connected to the lower fascia portion and a fixed vehicle structure.

The engine shield 50 is shown in greater detail in FIGS. 5-6. The engine shield 50 includes at least a first shield panel 52 and a second shield panel 54. The first shield panel 52 has a first portion 56 that moves with the lower fascia portion 16 and a second portion 58 that is connected to the vehicle static structure 30 as indicated at 60 in FIG. 4. The second shield panel 54 includes at least left 62 and right 64 side portions that move with the lower fascia portion 16. In one example, the left 62 and right 64 side portions are connected to each other via a center portion 70. The center portion 70 is attached to the lower fascia portion 16 as shown in FIG. 6.

In one example, the first portion 56 of the first shield panel 52 moves with the lower fascia portion 16 via at least one first hinge 66. In one example, the first portion 56 is hinged to the center portion 70 of the second shield panel 54, which is fixed to the lower fascia portion 16. The first hinge 66 can comprise a connection that couples respective hinge bosses from the center portion 70 and the first portion 56; however, other types of hinges could also be used.

In one example, the second portion 58 of the first shield panel 52 is connected to the vehicle static structure 30 with at least one second hinge 68. In one example, the second hinge 66 comprises a living hinge; however, other types of hinges could also be used.

Figure 7A:
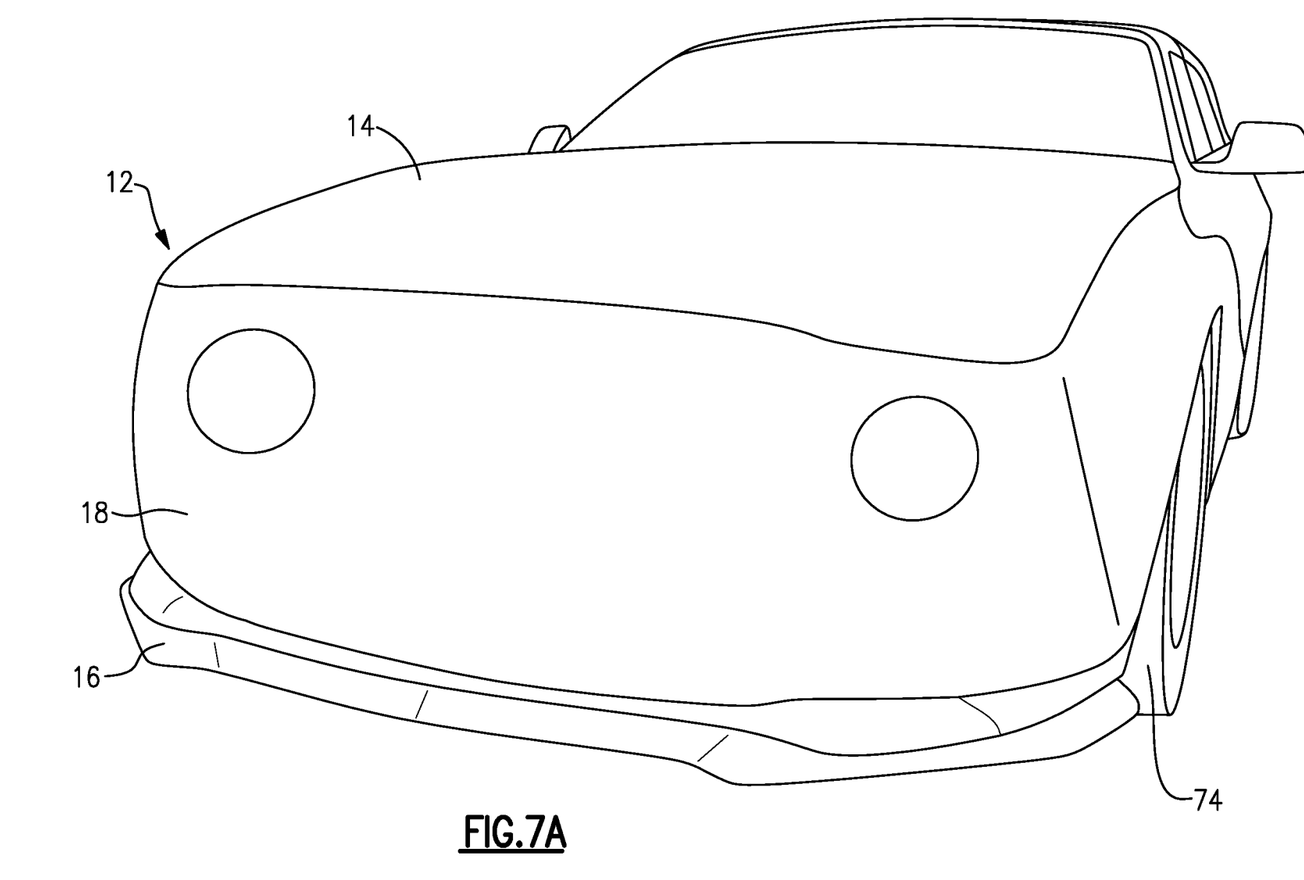
FIG. 7A is a front perspective view of the lower fascia portion and engine shield in the non-deployed position.
Figure 7B:
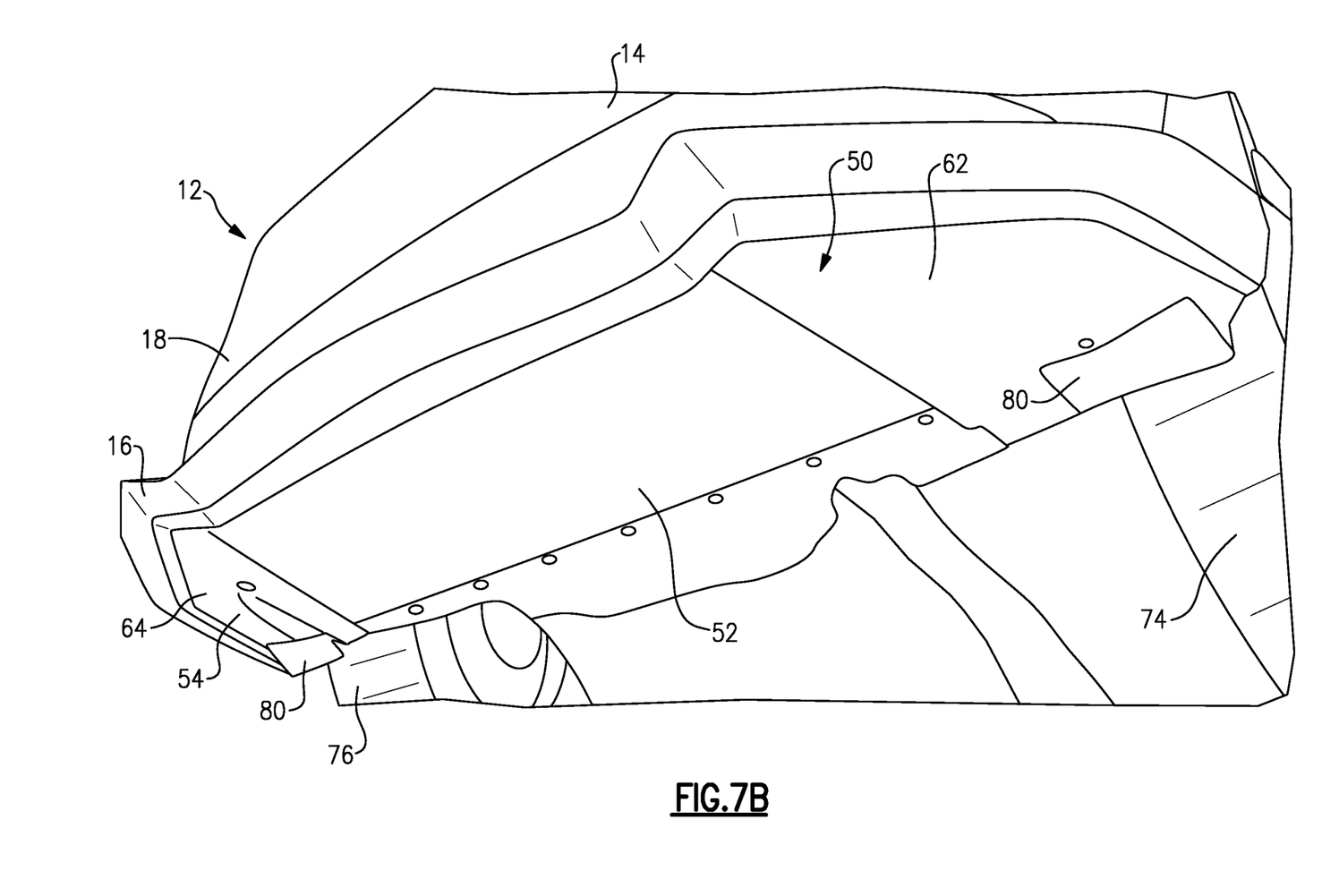
FIG. 7B is a lower perspective view of the lower fascia portion and engine shield in the non-deployed position.
Figure 8A:
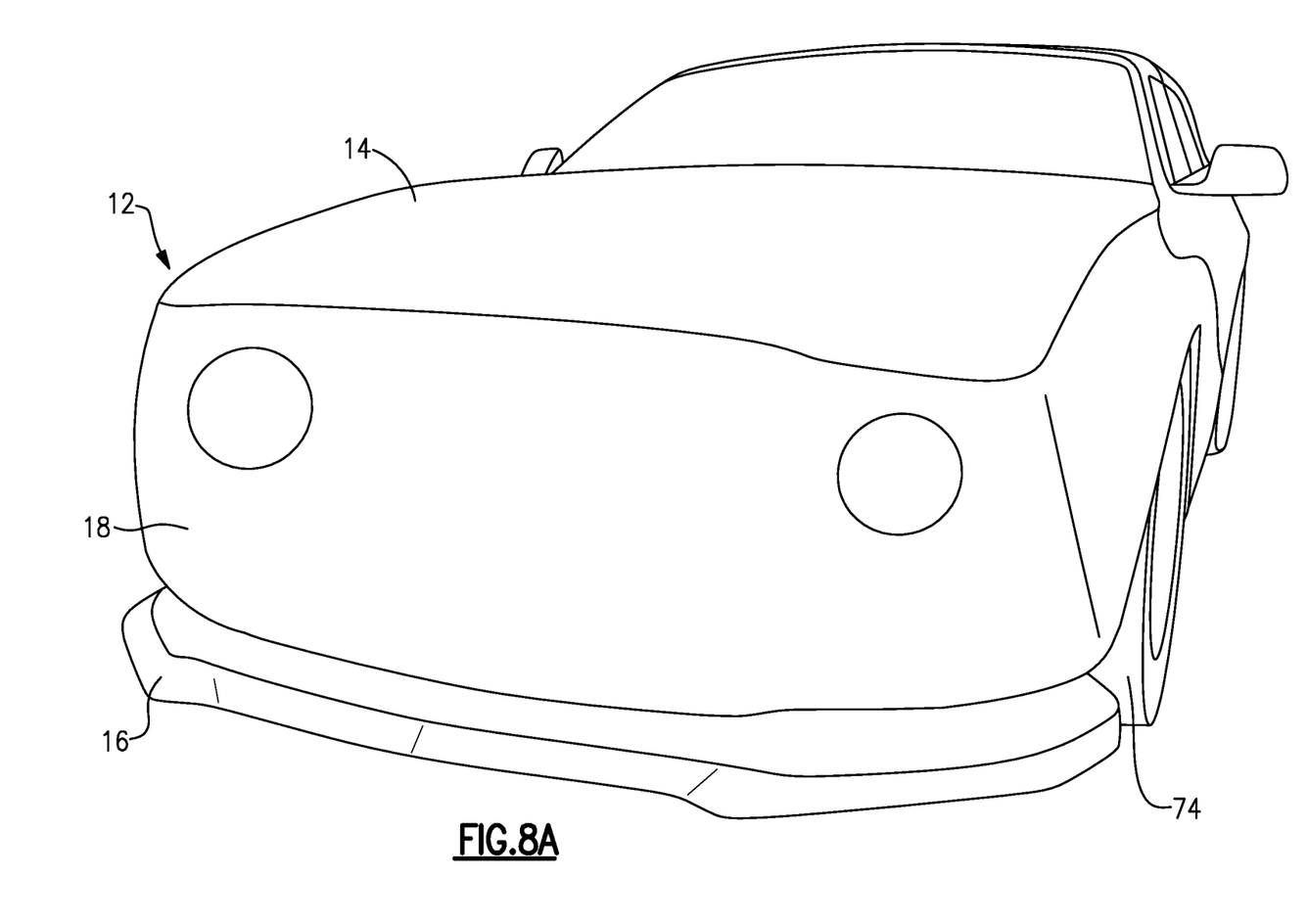
FIG. 8A is a front perspective view of the lower fascia portion and engine shield in the deployed position.
Figure 8B:
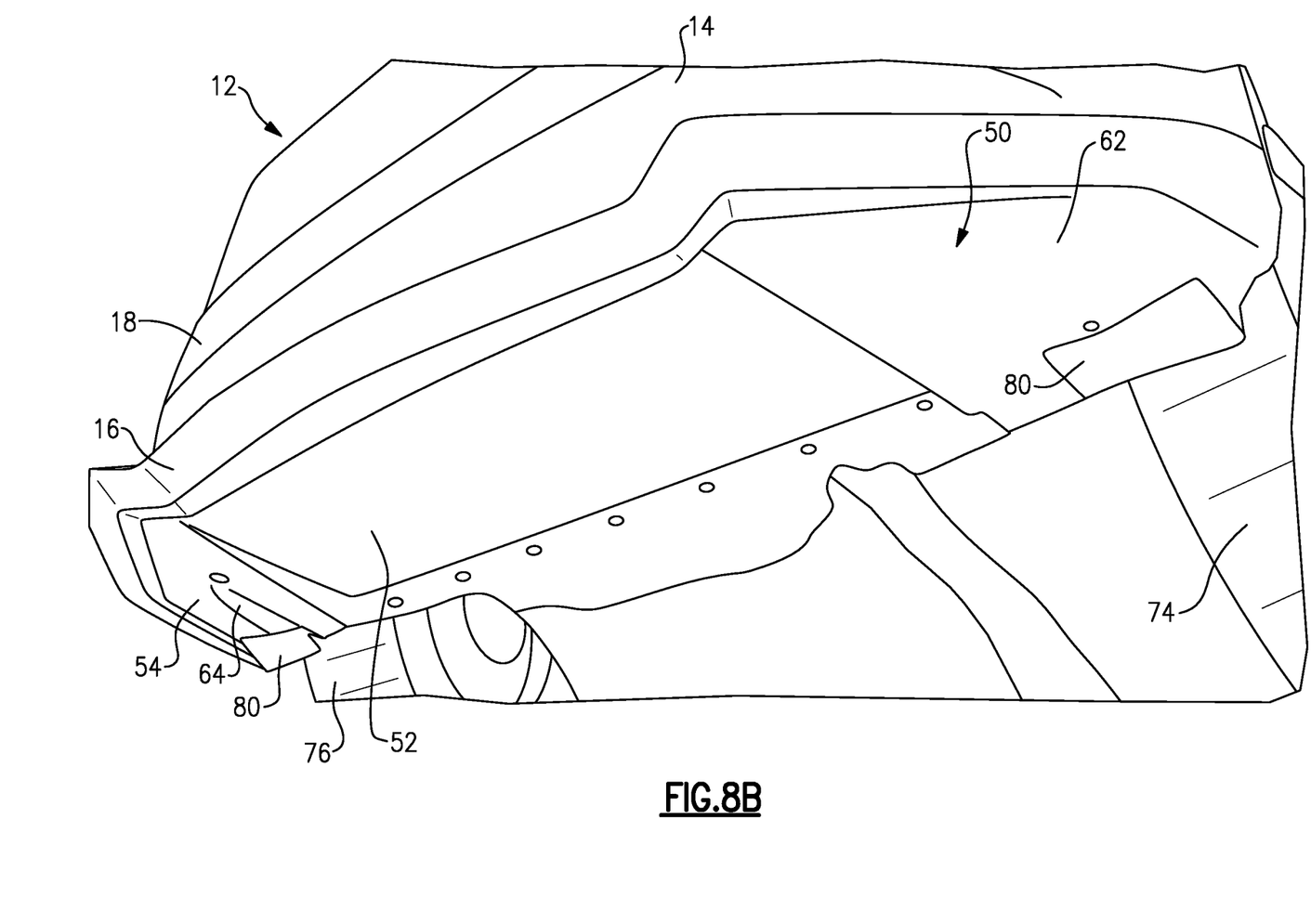
FIG. 8B is a lower perspective view of the lower fascia portion and engine shield in the deployed position.

The subject disclosure provides an engine shield 50 that is coupled to the lower fascia portion 16 for movement as a unit. FIGS. 7A-7B show the lower fascia portion 16 and engine shield 50 in the non-deployed position. FIGS. 8A-8B show the lower fascia portion 16 and engine shield 50 in the deployed position. The first shield portion 52 comprises a center panel that has a front edge the moves with the lower fascia portion 16. The second shield panel 54 includes left 62 and right 64 side portions that move vertically with the lower fascia portion 16 to lower respectively in front of left 74 and right 76 side tires as shown in FIG. 8B.

As shown in FIG. 8B, when the lower fascia portion 16 and engine shield 50 are moved to the deployed position, the center panel becomes angled relative to ground. As shown, the first portion 56 of the first shield panel 52 (center panel) comprises a front edge and the second portion 58 comprises a rear edge such that the front edge moves with the lower fascia portion 16 via the first hinge 66 when the lower fascia portion 16 is lowered toward the ground. The first shield panel 52 (center panel) rotates at the rear edge via the second hinge 68, which is fixed to the static structure 30, when the first fascia portion is lowered 16 such that the first shield panel 52 is angled relative to ground with the rear edge being vertically higher than the front edge. The left 62 and right 64 side portions of the engine shield 50 move vertically with the lower fascia portion 16 in front of the respective left and right tires 74, 76 such that the rear portion 58 of the center panel is vertically higher than the left 62 and right 64 side portions of the engine shield 50. This creates a pocket of air underneath the engine that further increases down force. When in the non-deployed position, the center panel is no longer in the angled position and the left 62 and right 64 side portions are flush with the center panel as shown in FIG. 7B.

In one example, the left 62 and right 64 side portions of the second shield panel 54 each include an angled ramp portion 80 (FIGS. 5, 7B, and 8B) extending outwardly of a main panel body. When in the deployed position, the angled ramp portions reduce drag and further facilitate guiding air flow around the tires 74, 76 to provide for faster speeds and increased fuel economy.

As discussed above, the linear actuators 22 are controlled by the control module 24 to selectively raise or lower the lower fascia portion 16 and the engine shield 50 as a unit in response to one or more predetermined vehicle input conditions such as vehicle speed, road condition, braking input, or driver select mode, for example. In one example, the control module 24 deploys the actuators to move the lower fascia portion 16 and the engine shield 50 if the vehicle exceeds a predetermined speed. When in the deployed position, lift is reduced and down force is increased to improve cornering capability. In one example, the control module 24 retracts the fascia portion 16 and the engine shield 50 when in a jounce mode or at low vehicle speeds such that parking maneuvers can be accomplished without damaging the fascia.

The subject disclosure provides a front lower fascia splitter connected to an under engine belly pan/engine shield that is actuated via an actuating system, which is controlled by a power train control module, for example, that deploys and retracts the unit based on predetermined vehicle conditions. The dynamic fascia splitter and engine shield are packaged under the engine and are actuated vertically across the full cross-car front (horizontal width) of the vehicle and, when deployed, the splitter and engine shield reduce drag in front of the tires and increase down force to the front wheels.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a fascia including a first fascia portion that is selectively moveable relative to a second fascia portion;
   an engine shield including at least a first shield panel and a second shield panel connected to each other with a first hinge, wherein the first shield panel has a first portion that moves with the first fascia portion and a second portion connected to a vehicle static structure with a second hinge, and wherein the second shield panel is mounted for movement with the first fascia portion; and
   at least one actuator that selectively moves the first fascia portion relative to the second fascia portion in response to at least one predetermined vehicle input condition.

2. The apparatus according to claim 1, wherein the first portion of the first shield panel moves with the first fascia portion via the first hinge.

3. The apparatus according to claim 1, wherein the fascia is configured to extend across an entire front of a vehicle, and wherein the second fascia portion is held fixed while the first fascia portion is lowered toward ground by the at least one actuator in response to one or more predetermined vehicle input conditions.

4. The apparatus according to claim 3, wherein the first portion of the first shield panel comprises a front edge and the second portion of the first shield panel comprises a rear edge, and wherein the front edge moves with the first fascia portion via the first hinge when the first fascia portion is lowered toward the ground and wherein the first shield panel rotates at the rear edge via the second hinge when the first fascia portion is lowered such that the first shield panel is angled relative to ground with the rear edge being vertically higher than the front edge.

5. The apparatus according to claim 4, wherein the first shield panel comprises a center panel and wherein the second shield panel includes at least left and right side portions that move vertically with the first fascia portion to lower respectively in front of left and right side tires.

6. The apparatus according to claim 1, wherein the at least one predetermined vehicle input condition includes at least one of the following: vehicle speed, road condition, braking input, driver select mode.

7. The apparatus according to claim 1, wherein the at least one actuator comprises at least left and right side linear actuators.

8. The apparatus according to claim 1, including a control module that controls the at least one actuator based on one or more predetermined vehicle input conditions.

9. The apparatus according to claim 1, wherein the first shield panel comprises a center panel and wherein the second shield panel includes at least left and right side portions connected to each other via a center portion that is connected to the lower fascia portion, and wherein the first portion of the first shield panel is connected to the center portion of the second shield panel with the first hinge.

10. An apparatus, comprising:
a front fascia including a lower fascia portion that is selectively moveable relative to an upper fascia portion;
an engine shield including at least a first shield panel and a second shield panel, wherein the first shield panel has a first portion that moves with the lower fascia portion and a second portion that is connected to a vehicle static structure, and wherein the second shield panel includes at least left and right side portions that move with the lower fascia portion;
at least one actuator that selectively moves the lower fascia portion relative to the upper fascia portion;
a control module that controls the at least one actuator based on one or more predetermined vehicle input conditions;
wherein the front fascia is configured to extend across an entire front of a vehicle, and wherein the upper fascia portion is held fixed while the lower fascia portion is lowered toward ground by the at least one actuator in response to one or more predetermined vehicle input conditions; and
wherein the front edge of the first shield panel moves with the lower fascia portion when the lower fascia portion is lowered toward the ground and wherein the first shield panel rotates at the rear edge when the lower fascia portion is lowered such that the first panel is angled relative to ground with the rear edge being vertically higher than the front edge.

11. The apparatus according to claim 10, wherein the at least one predetermined vehicle input condition includes at least one of the following: vehicle speed, road condition, braking input, driver select mode.

12. The apparatus according to claim 10, wherein the at least one actuator comprises at least left and right side linear actuators.

13. An apparatus, comprising:
a front fascia including a lower fascia portion that is selectively moveable relative to an upper fascia portion;
an engine shield including at least a first shield panel and a second shield panel, wherein the first shield panel has a first portion that moves with the lower fascia portion and a second portion that is connected to a vehicle static structure, and wherein the second shield panel includes at least left and right side portions that move with the lower fascia portion, wherein the first portion of the first shield panel comprises a front edge and the second portion of the first shield panel comprises a rear edge, and including at least a first hinge connection at the front edge and a second hinge connection at the rear edge;
at least one actuator that selectively moves the lower fascia portion relative to the upper fascia portion; and
a control module that controls the at least one actuator based on one or more predetermined vehicle input conditions.

14. The apparatus according to claim 13, wherein the left and right side portions of the second shield panel each include an angled ramp portion extending outwardly of a main panel body.

15. The apparatus according to claim 14, wherein the angled ramp portion of the right side portion is aligned with a right side tire and the angled ramp portion of the left side portion is aligned with a left side tire such that as the lower fascia portion is lowered relative to ground, the angled ramp portions of the left and right side portions move vertically downward in front of the left and right side tires.

16. A method comprising:
providing a front fascia including a lower fascia portion that is selectively moveable relative to an upper fascia portion;
providing an engine shield including at least a first shield panel and a second shield panel connected to each other with a first hinge;
configuring the first shield panel to have a first portion that moves with the lower fascia portion and a second portion that is rotatably connected to a vehicle static structure with a second hinge;
configuring the second shield panel to move with the first fascia portion; and
selectively moving the lower fascia portion relative to the upper fascia portion in response to at least one predetermined vehicle input condition.

17. The method according to claim 16, including extending the front fascia across an entire front of a vehicle, fixing the upper fascia portion to a static structure, and selectively lowering the lower fascia portion toward ground with at least one actuator in response to one or more predetermined vehicle input conditions.

18. The method according to claim 17, wherein the second shield panel includes at least left and right side portions, and wherein the first portion of the first shield panel comprises a front edge and the second portion of the first shield panel comprises a rear edge and, when the lower fascia portion is lowered toward the ground,
the front edge of the first shield panel moves with the lower fascia portion via the first hinge and the first shield panel rotates at the rear edge via the second hinge such that the first shield panel is angled relative to ground with the rear edge being vertically higher than the front edge, and
the left and right side portions of the second shield panel move vertically with the lower fascia portion to lower respectively in front of left and right side tires.

19. The method according to claim 16, wherein the at least one predetermined vehicle input condition includes at least one of the following: vehicle speed, road condition, braking input, driver select mode.

20. The method according to claim 16, wherein the first shield panel comprises a center panel and wherein the second shield panel includes left and right side portions connected to each other via a center portion that is connected to the lower fascia portion, and wherein the first portion of the first shield panel is connected to the center portion of the second shield panel with the first hinge.

\* \* \* \* \*

UNITED STATES PATENT AND TRADEMARK OFFICE
CERTIFICATE OF CORRECTION

PATENT NO. : 11,180,203 B2
APPLICATION NO. : 16/687852
DATED : November 23, 2021
INVENTOR(S) : Aaron Peter Klop et al.

Page 1 of 1

It is certified that error appears in the above-identified patent and that said Letters Patent is hereby corrected as shown below:

In the Claims

In Claim 9, Column 7, Line 17; replace "lower fascia portion" with --first fascia portion--

In Claim 10, Column 7, Line 42; replace "the front edge" with --a front edge--

In Claim 10, Column 7, Line 45; replace "the rear edge" with --a rear edge--

In Claim 10, Column 7, Line 46; replace "the first panel" with --the first shield panel--

In Claim 16, Column 8, Line 35-36; replace "the first fascia portion" with --the lower fascia portion--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*